May 3, 1949.  J. RIFEN  2,468,780

BOTTLE ATTACHMENT

Filed July 13, 1946

INVENTOR.
John Rifen
BY Eugene E. Stevens
ATTORNEY.

Patented May 3, 1949

2,468,780

UNITED STATES PATENT OFFICE 2,468,780

BOTTLE ATTACHMENT

John Rifen, Brainerd, Minn.

Application July 13, 1946, Serial No. 683,555

6 Claims. (Cl. 215—38)

My invention relates to attachments for bottles and the like and it has for its primary object not only to provide a device for facilitating the carrying of bottles, such as milk bottles, but which will also provide a closure for the bottle, or a protection for a closure of the typical milk bottle cap type which is already applied to the bottle.

Additionally, the invention contemplates a device for one or both of the purposes hereinabove specified, which is simple in construction, economical to manufacture, and strong and durable.

It is also an object of the invention to provide in a bottle carrier or closure means for yieldably retaining the device in place on the top of the bottle and which yielding means is preferably associated with a carrying handle in such a manner that the lifting of the bottle by the handle after the device has been applied, will more firmly act upon the yielding retaining means to prevent accidental detachment of the device from the bottle while it is being transported from place to place.

The invention also resides in certain novel features of construction, combination, and arrangement of parts, in addition to mode of operation, all of which will be readily understood upon reference to the accompanying drawing, in connection with the detailed description appearing hereinafter.

In fulfillment of the patent statutes requirements, I have illustrated in the drawing, the now preferred form of the invention. However, it will be obvious that my inventive concept is susceptible of other mechanical expressions within the spirit and scope of the subject matter claimed hereinafter.

In the drawings, wherein the same reference characters have been used to designate the same parts throughout the several views, Fig. 1 is a fragmentary side elevational view of the upper portion of a typical milk bottle illustrating the application of my novel combined closure and carrier thereto;

Figure 1:
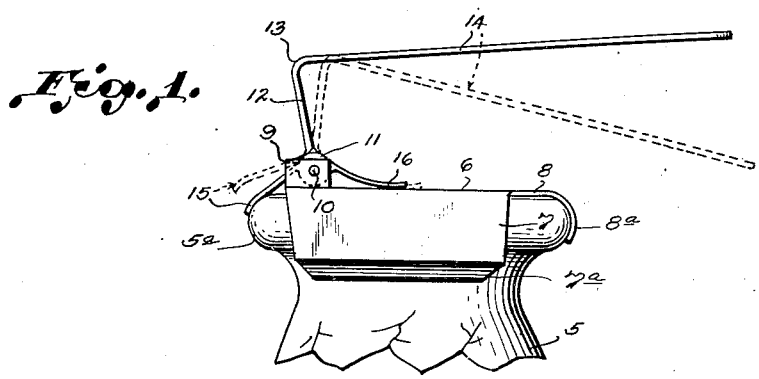

Referring to the drawing by reference characters, numeral 5 denotes a milk bottle or the like having at its top the usual lip enlargement 5a.

Figure 3:
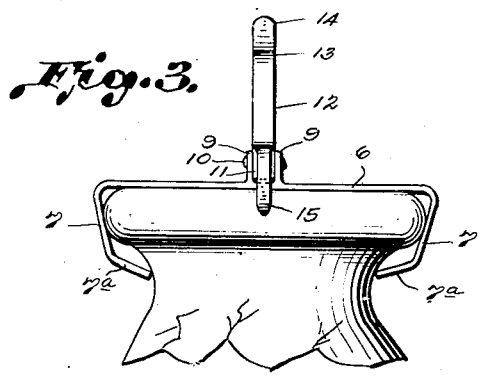
Fig. 3 is an elevational view taken at right angles to the device as shown in Fig. 1.

The invention, as illustrated, takes the form of a substantially U-shaped metal stamping having the bight portion 6 and the side arms 7, which latter are adapted to extend tangentially inward in contact with opposite sides of the bottle lip 5a, as best illustrated in Fig. 3.

Fig. 3 also discloses the lip-engaging sides of the device as terminating in inwardly extending portions 7a which are adapted to engage the neck portion of the bottle 5, below the lip 5a.

The width of the bight portion 6 of the combined closure and carrier member, is sufficient to entirely cover the top of the bottle, that is, according to the preferred example of the invention, as illustrated. In this connection, see Fig. 2. However, it will be apparent that inasmuch as the milk bottle of the usual type has the conventional disk-like closure cap (not shown), it is not necessary that the member 6, 7 actually provide the closure.

Obviously, my bottle attachment 6, 7 may be of other material than an imperforate metal stamping; and it need not, at least so far as the broad aspects of the invention are concerned, cover the whole top of the bottle within the interior confines of the lip 5a.

Figure 2:
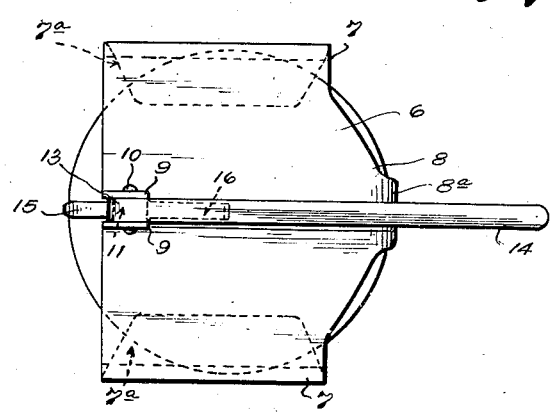
Fig. 2 is a top plan view of the device as illustrated in Fig. 1.

Turning to Figs. 1 and 2, the bight portion 6 of the attachment has at which might be termed its forward end, the downwardly curved lip-embracing extension 8a, which forms a continuation of the intermediate forward part 8 of the bight portion 6 of the attachment between the leg portions 7. The curved lip engaging portion 8a serves to limit the sidewise insertion of the device onto the bottle lip 5a. The curved lip engaging portion 8a also extends downwardly past what might be termed the horizontal dead-center of the lip 5a and thus, as will hereinafter be more apparent, the portion 8a assists in maintaining a grip on the bottle lip when the bottle is lifted by the attachment.

Still referring to Figs. 1 and 2, but also having in mind the rear elevational view, Fig. 3, it will be noted that the bight portion 6 of the device has at the edge opposite the curved lip engaging portion 8a, the upwardly struck ears 9. These ears 9 are spaced from one another to receive the disk-like bearing 11 which forms the terminal of the short downwardly extending arm 12 — (Fig. 1) — which arm is bent at approximately a right angle, as indicated at 13, to provide the carrying handle portion 14.

Associated with the bearing 11 of the carrying handle 12, 14, is novel means for not only maintaining the carrying handle portion 14 in a substantially horizontal position, for convenience in lifting the bottle, but also for retaining the attachment in place. One element of said means takes the form of the rearwardly extending preferably spring metal finger 15, which is adapted to engage the outer surface of the lip 5a of the bottle for the purpose of maintaining the attachment in non-shifting relationship on the bead or lip 5a. The spring arm or finger 15 may be integral with the bearing disk 11 of handle 12, 14, or it may be welded or otherwise secured thereto.

Urging the arm or spring finger 15 into the operative position shown in full lines in Fig. 1, is the forwardly extending spring finger 16 which also may be integral or welded to the bearing disk 11. This arm or finger 16 bears, as shown in Figs. 1 and 2, against the top surface of the bight portion 6 of the device so as to normally tend to maintain the lip engaging and retaining finger or arm 15 in the full line position of Fig. 1. However, it will be obvious that when the carrying handle 14, 12 is pushed down to the dotted line position of Fig. 1, the lip engaging or retaining finger 15 will be raised to the dotted line position of Fig. 1. Thus, the device can be slid off the bottle lip 5a, the movement of same being to the right, as viewed in Fig. 1.

From the foregoing description, taken in connection with the accompanying drawing, it will be apparent that when it is desired to apply the device to a bottle, the handle 14 is depressed to the dotted line position of Fig. 1, which raises the lip engaging arm or finger 15 to the dotted line position shown in that view. This movement is, of course, yieldingly resisted by the forwardly extending finger 16 which engages the bight portion 6 of the attachment.

After the device has been slid onto the enlarged bead 5a of the bottle, the handle 14 is released to permit it to assume the full line position under the action of the forwardly extending spring finger 16. The bottle can now be lifted by grasping the substantially horizontal handle portion 14.

The weight of the bottle 5 is transmitted to the handle portion 14 by the pivot pin 10 which extends through the opposed ears 9. The lip engaging or retaining finger 15 is sufficiently stiff to resist counter-clockwise movement of the lever 12, 13, 14, when the weight of the bottle 5 is transmitted thereto; and it will be apparent that the hand of the user will be substantially over the central portion of the bottle top. The bottle 5 may thus be carried very conveniently in the natural vertical position with no danger of spilling the contents.

Although it has been mentioned that the device is preferably a metal stamping, it may, of course, be made of other materials, such as, for instance, plastic.

As previously stated, the device in effect provides a cover for the bottle 5; and in any event a protector for the cardboard disk-like bottle cap which is usually used as a milk bottle closure.

Owing to the inward slant of the lip-engaging sides 7 they engage the lip slightly below what might be called its horizontal "dead center." This holds the closure-providing bight portion 6, 8 in tight contact with the top of the bottle lip 5a.

In practice, the device may be left applied to the bottle when it is in the refrigerator, as the handle 14 does not rise substantially above the plane of the upper part of the lip 5a of the bottle. It is the task of but a moment to engage or disengage the device from the bottle and the operation can, of course, be performed with one hand.

Having thus described my invention, what I claim is:

1. A device of the class described comprising in combination, a body, opposed downwardly extending parts at opposite sides of said body, said parts having opposed grooves adapted to engage a beaded bottle lip, an intermediate bottle lip-engaging means extending downwardly from said body adjacent one end between said first mentioned downwardly extending parts and adapted to limit insertion of the device onto a beaded bottle top, spaced bearing ears carried by said body adjacent the end theerof opposite said intermediate bottle lip-engaging means, a depending lip-engaging finger having a bearing pivoted between said ears, yielding means carried by said bearing and engaging the body to normally hold said finger in lip-engaging position, and a carrying handle connected to said bearing, said handle having a hand grip portion lying in a plane above and somewhat parallel to the plane of said body.

2. A bottle carrier comprising in combination a body disposable upon the beaded lip of a bottle, depending lip underlying sides carried by said body, a carrying handle having a bearing end pivoted to said body, a lip engaging stop carried by the bearing end of said handle and actuated to operative position when the handle is grasped to lift an attached bottle, and yielding means carried by said handle bearing and engaging the top of said body to normally maintain both handle and stop in operative position.

3. A device of the class described comprising in combination, a body, opposed downwardly extending parts at opposite sides of said body, said parts having opposed grooves adapted to engage a beaded bottle lip, an intermediate bottle lip-engaging means extending downwardly from said body adjacent one end between said first mentioned downwardly extending parts and adapted to limit insertion of the device onto a beaded bottle top, spaced bearing ears carried by said body adjacent the end thereof opposite said intermediate bottle lip-engaging means, a depending lip-engaging finger, a bearing carried by said finger and pivoted between said ears, and yielding means carried by said finger bearing and engaging the body to normally hold said finger in lip-engaging position.

4. A device of the class described comprising in combination, a body, opposed downwardly extending parts at opposite sides of said body, said parts having opposed grooves adapted to engage a beaded bottle lip, an intermediate bottle lip-engaging means extending downwardly from said body adjacent one end between said first mentioned downwardly extending parts and adapted to limit insertion of the device onto a beaded bottle top, spaced bearing ears carried by said body adjacent the end thereof opposite said intermediate bottle lip-engaging means, a depending lip-engaging finger, a bearing carried by said finger and pivoted between said ears, yielding means carried by said finger-carried bearing and engaging the body to normally hold said finger in lip-engaging position, and a carrying handle connected to said finger-carried bearing.

5. A bottle carrier comprising in combination a body disposable upon the beaded lip of a bottle, depending lip underlying sides carried by said body, a carrying handle having horizontal pivot means inwardly of one end of said handle and pivoting same to said body, and a lip-engaging stop provided by said handle end outwardly of said pivot means, said stop being actuated to lip-engaging position when the handle is grasped to lift an attached bottle.

6. A bottle closure and carrier comprising a plate-like body, downwardly extending bottle lip-engaging portions at three sides of said body, a carrying handle pivoted adjacent one end to said body for vertical movement in respect thereto, a bottle lip-engaging extension carried by said handle at one side of the pivot, and a yielding bottle top engaging member carried by said handle at the other side of said pivot whereby to normally dispose the handle in gripping position and its lip-engaging extension in operative position.

JOHN RIFEN.

REFERENCES CITED

The following references are of record in the file of this patent:

UNITED STATES PATENTS

| Number | Name | Date |
| --- | --- | --- |
| 882,550 | Chellis | Mar. 17, 1908 |
| 1,307,067 | Vaughan | June 17, 1919 |
| 1,421,257 | Knudsen | June 27, 1922 |
| 2,127,776 | Krueger | Aug. 23, 1938 |